United States Patent [19]

Heins et al.

[11] Patent Number: 4,466,096
[45] Date of Patent: Aug. 14, 1984

[54] APPARATUS AND METHOD FOR PROVIDING TRANSMITTER HIERARCHY CONTROL FOR EFFICIENT CHANNEL MANAGEMENT

[75] Inventors: Donald E. Heins; Robert C. McGaffin, both of Raleigh, N.C.

[73] Assignee: International Business Machines Corporation, Armonk, N.Y.

[21] Appl. No.: 357,222

[22] Filed: Mar. 11, 1982

[51] Int. Cl.³ .......................... H04J 15/00; H04L 5/22
[52] U.S. Cl. ..................................... 370/85; 340/825.5
[58] Field of Search ........................ 370/85, 86, 95, 89; 455/58; 340/825.5, 825.51

[56] References Cited

U.S. PATENT DOCUMENTS

| | | | |
|---|---|---|---|
| 3,553,656 | 1/1971 | Bernhardt | 340/825.5 |
| 3,701,109 | 10/1972 | Peters | 340/825.51 |
| 3,878,512 | 4/1975 | Kobayashi et al. | 370/85 |
| 4,016,539 | 4/1977 | Nanya | 340/825.5 |

Primary Examiner—Douglas W. Olms
Assistant Examiner—Frank M. Scutch, III
Attorney, Agent, or Firm—John B. Frisone

[57] ABSTRACT

Apparatus and method for providing a transmit hierachy for efficiently managing a communications channel. Stations using a common communications channel are equipped with an apparatus for issuing a plurality of consecutive delay times. If energy is not detected on the channel during one of the consecutive time delays, the station is permitted to transmit. If energy is detected a shorter subsequent time delay is issued and the channel is again monitored. Stations are arranged in a transmit hierachy according to the earliest which have attempted access to the channel.

5 Claims, 4 Drawing Figures

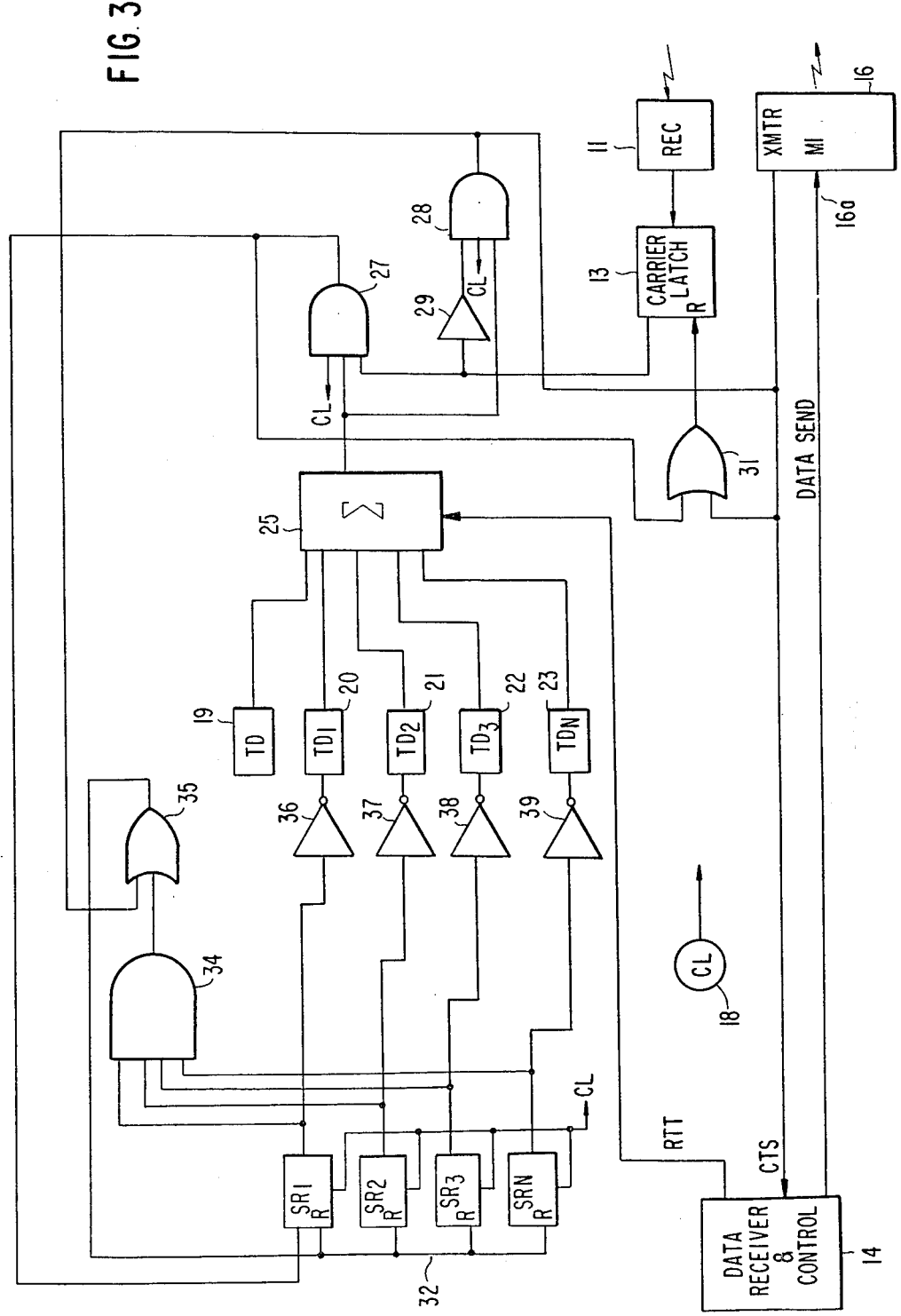

APPARATUS AND METHOD FOR PROVIDING TRANSMITTER HIERARCHY CONTROL FOR EFFICIENT CHANNEL MANAGEMENT

DESCRIPTION

BACKGROUND ART

The present invention relates to R.F. communications frequency spectrum management. Specifically, in the art of personal communications, an apparatus and method are provided to permit efficient use of a common channel by a plurality of local users while avoiding interference between users.

The R.F. communications spectrum is managed under current law to provide the equitable use of the radio frequency spectrum for members of the public. Current regulations for local geographic users permit the use of a single channel of the communications radio spectrum by multiple parties. This therefore requires time limitations now set to be two minutes, on users assigned to a common frequency, and a brief waiting period is imposed before using the frequency to be certain the channel is clear before a user commences transmission.

Two way digital radio has also been used to provide communications between a base station and plurality of subservient or "slave" stations. A controller at each base station is used to determine when a base station may commence transmission. The base station interrogates or "polls" each subsidiary station when the channel is clear thus determining whether a signal is to be sent. The polling, however, takes up channel time which is wasted if the polled stations do not have traffic to send.

The use of digital communications in local geographic areas among users of a common channel holds the promise of permitting a more efficient use of the commonly shared communications channels. Transmitters and receivers can be arranged which transmit a digital message of fixed length which when received is decoded and displayed. Proposals of this type which rather than using voice communications utilize digital messages arranged in packets for transmission are more completely set forth in a study conducted under contract to the Federal Communications Commission, FCC contract number 188, December 1976, "A study of Digital uses and Standards for Land/mobile channels" by Sachs/Freeman Associates, Inc.

The present invention will provide management of a communications channel which implements the digital communication concepts embodied in the study.

SUMMARY OF INVENTION

It is an object of this invention to provide efficient management of traffic on a communications channel which is accessible by a plurality of users.

It is a more specific object of this invention to provide for each of a plurality of base stations communicating with associated slave stations a controller for establishing a transmission hierarchy for users when a channel is busy.

These and other objects are provided by apparatus and methods in accordance with the present invention. A controller for a transmit station is provided to permit a transmission when a channel is detected to be open and available. The channel may be the radio frequency broadcast spectrum or cable and related signal carrying mediums.

At each station a time delay is set and permitted to expire. If during the time delay traffic is detected on the channel, subsequent time delays are initiated at the conclusion of the previous time delay. If traffic remains on the channel during a subsequent time delay, transmission remains inhibited and additional time delays are generated.

The time delays are arranged such that successive time delays are shorter than a previous time delay. When more than one station is contending for use of the channel, the station which has been contending for the longest period of time is generating shorter time delays thus enhancing its ability to gain access to the channel over later contending stations.

In one embodiment of the invention, a plurality of master-slave stations have a common communications channel. At each master station is a controller which generates a composite time delay comprising a basic time delay and a plurality of shorter time delays following the basic delay. When a message is to be transmitted, the basic time delay and N smaller time delays are initiated and summed and the channel is monitored for traffic. If energy is detected in the channel during the time delay, a second time delay is initiated comprising the basic time delay and N−1 smaller time delays. The composite time delays are repeated and shortened by smaller time delays each time traffic is detected until N time delays have been produced. If traffic continues to remain on the channel after N successive time delays have been produced, the cycle is repeated beginning with the longest time delay. If during one time delay no energy is detected the master station is enabled for transmitting.

The slave stations may also include a hierarchy control similar to that at each base station. In a preferred embodiment the slave stations are arranged to detect an absence of RF energy for a minimum time as the criteria for permitting transmission to the master station. The slave stations monitor for a period of time equivalent to the time required for a base station message packet, a slave station response time, and slave message packet length before enabling transmission.

BRIEF DESCRIPTION OF THE DRAWINGS

FIG. 3 is an schematic illustration of one embodiment of a controller for each master station.

DESCRIPTION OF THE BEST MODE FOR CARRYING OUT THE INVENTION

Figure 1:
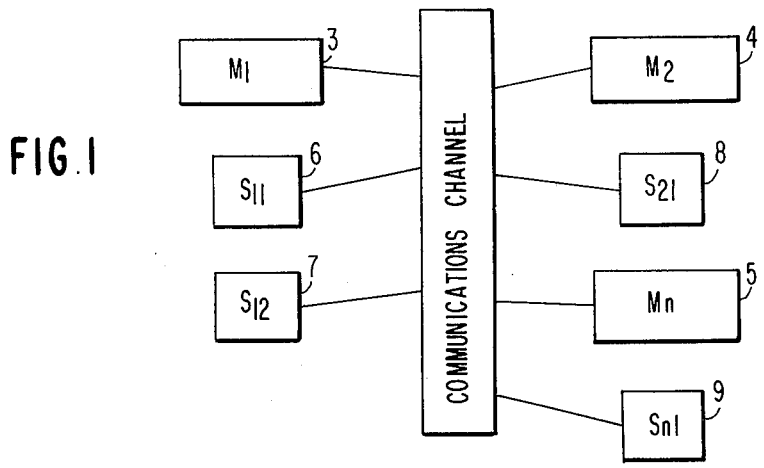
FIG. 1 is an illustration of a communications channel managed in accordance with the present invention.

Referring now to FIG. 1, a contention mode communications system having a transmit hierachy in accordance with the present invention is shown. The system includes a plurality of base master stations $M_1$, $M_2$, $M_3$, 3-5 connected to a common communications channel, which in a preferred embodiment is a single frequency of the radio spectrum.

Also shown in the figure are a plurality of subservient, or slave stations 6–9, $S_{11}$, $S_{12}$, $S_{21}$, $S_{n1}$ which communicate with a specific master station.

The master stations each include a controller which monitors the traffic on the channel. When a master station generates a request to transmit a packet of digital data to a slave station, a request to transmit, RTT, command enables the master station to monitor traffic on the channel. The traffic on the channel is monitored for a period of time equivalent to the time AC, to transmit the longest message at the slowest baud rate. If a 1200 bits per second rate is used, a message length of 256 bytes requires 1.8 seconds. Therefore, the station must monitor traffic for at least this amount of time. Additional to this basic time AC1, is an tolerance time AT, which corresponds to the maximum tolerance between time delays of all master stations. Also AR, the response time of a slave station to a request to transmit from a base station is added to the required listening time. Therefore, the total time for listening to the channel to determine whether it is clear is:

AC1+AR+AT

If at any time during the time delay, traffic is monitored on the channel, a subsequent shorter time delay is initiated at the conclusion of the above time delay. Additional, shorter time delays are initiated in response to a continued detection of traffic on the channel. If N time delays are initiated without an indication that the channel is clear for at least one time delay the cycle is repeated beginning with the longest time interval AC1+AR+AT.

It is clear that if two or more base stations generate an RTT signal during the time the channel is handling traffic from another station, the station which first generates the RTT signal is the first to acquire the channel.

Figure 2:
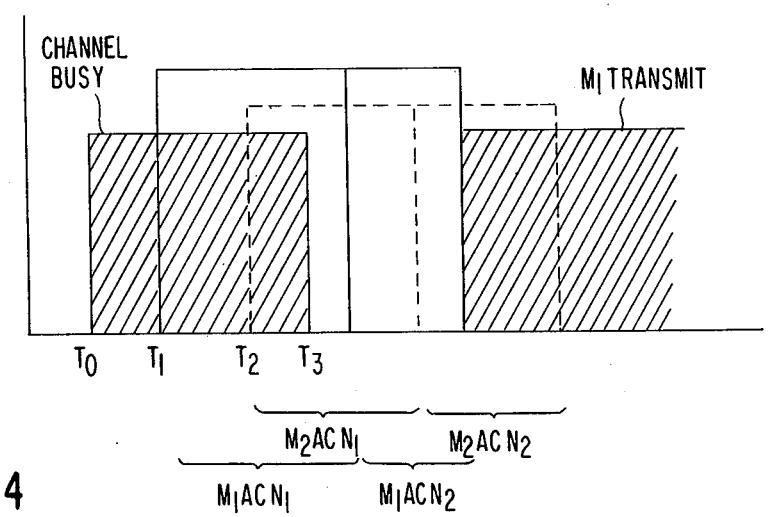
FIG. 2 illustrates the time delays generated when two stations contend for a channel carrying a signal.

Referring to FIG. 2, this hierarchy is demonstrated. At time To, traffic from a station is present on the channel. Station $M_1$, 3 generates an RTT command at T1 and station $M_2$,4 generates an RTT command at T2. Each station $M_1$,3, $M_2$,4 will generate a series of time delays ACN. It is clear that station $M_1$ will detect during period Acn2 the absence of RF energy for a complete time delay before station $M_2$,4 detects for one complete time delay the absence of RF energy. Therefore, at the conclusion of ACN2, $M_1$ acquires the channel and begins transmitting.

The secondary, slave stations need not be controlled according to the above master station control system. The slave stations in a preferred embodiment may transmit after detecting the channel to be clear for a minimum amount of time ABTD. If during a time delay ABTD, RF energy is detected on the channel, subsequent time delays ABTD will be issued until a clear channel is detected during one of the time delays. The time delay will as in the case of the time delay for the base station be equal to the minimum message length time plus the response time for a slave station to respond to an interrogation by a master station. Once the slave station has acquired the channel, it initiates a bid message containing its address and network identification should there be a plurality of networks comprising master-slave combinations on the same channel. The master station will then answer the bid message with a command to the slave station to transmit. This master station response will also serve to silence other slave stations and master stations requiring them to initiate further time delays, thus holding the channel for the slave station. The slave station responds to the command transmitting its message. Once the master station receives the message an acknowledgement is sent to the originating slave station. If the master station does not acknowledge receipt of the message, the slave station will once again attempt to gain access to the channel by instituting additional time delays and sensing the channel for traffic.

The above system permits the use of a plurality of networks each of which may employ different modulation techniques and remain compatible. Access to the channel only depends on detecting the absence of RF energy for a predetermined time.

The above system also permits a base station under limited circumstances specified by appropriate regulation to maintain access by transmitting radio frequency energy into the channel. Thus, for public safety services such as fire or police activities, other stations can be silenced while emergency traffic is handled by the base station.

The master stations $M_1$, $M_2$, and $M_n$ are arranged in a hierarchy for channel access, absent some emergency condition, in which the first to generate a request to transmit, RTT, is given priority. A controller for each master station which utilizes this hierarchy is shown more particularly in FIG. 3.

Referring now to FIG. 3, there is shown a schematic drawing of a controller for each master station. Message data is assembled in a data packet at data receiver and control network 14. During power up of data receiver and control network 14, the shift register 32 is cleared by circuitry (not shown) but which is well known to those skilled in the art. When the data is assembled and ready for transmission, a RTT signal is applied to enable summation network 25 initiating a time delay of TD+TD1+TD2+TD3+TDn. The RTT signal is provided until a CTS, clear to send, signal is produced.

This time delay is the composite output signal of time delay generators 19-23 and represents a logical 0. The time delays provided by generators 19-23 are additive, each succeeding time delay beginning where the preceding time delay ends. The composite time delay is provided by summation network 25. This composite time delay is equivalent to ACn1 of FIG. 2. During the composite time delay, the output of summation network 25 is maintained at logic zero. At the end of a time delay, a logic 1 is applied to one input of AND gates 27 and 28. The remaining inputs of AND gates 27 and 28 are connected, respectively, to the output of carrier detector latch 13, and through inverter 29 to carrier detector latch 13.

The carrier detector latch 13 is connected to a radio frequency receiver 11 which continuously monitors the receive frequency. The carrier detector latch 13 is reset at the beginning of ACn1 by a signal from AND gate 27 through OR gate 31. Thus, the latch is ready to be set by an indication from receiver 11 that RF energy is on the channel constituting a busy channel. When RF energy is detected during Acn1, the carrier latch 13 is set, and AND gate 28 is not enabled, thus inhibiting transmitter 16 from sending data.

The AND gate 27 provides at the conclusion of a time period generated by summation network 25 an input signal to shift register 32. Shift register 32 has a plurality of stages which depending on the number of input signals received, will disable one or more time delay generators 20-23 through inverters 37-39. Clock pulses are provided by clock pulse generator 18 which gate a logic 1 produced by AND gate 27 into the shift register 32. The clock pulses are also applied to AND gates 27 and 28 to provide clocked output. Succeeding logic 1s produced by AND gate 27 will result in additional gating of logic 1s the shift register 32 thus disabling additional time delay generators. AND gate 27 also resets the latch 13 at the beginning of a subsequent, shorter time delay. At the conclusion of the time delay, produced as a result of a detection of RF energy during the preceding time delay, either AND gate 27 or AND gate 28 will produce a signal depending upon whether carrier latch 13 has detected RF energy during the time delay. If AND gate 27 continues to be enabled, time delay generators 20–23 will all be sequentially disabled, and OR gate 35 will produce a RESET signal for shift register 32 thus permitting the longest time delay to be initiated if the RTT signal remains.

If during any time delay no RF energy is detected on the channel, detector latch 13 will remain reset. The absence of an indication from carrier detector latch 13 will permit an enabling signal from AND gate 28 to be generated at the conclusion of a time delay produced by summation network 25. This CLEAR TO SEND, CTS, signal keys transmitter 16 on, and enables the message packet assembled at data receiver and control network 14 to be applied to the modulation input 16a of the transmitter. Also, OR gate 35 will reset the shift register 32 in response to a CTS signal. The data receiver and control network 14 upon receipt of a CTS signal removes the RTT signal from summation circuit 25.

Figure 4:
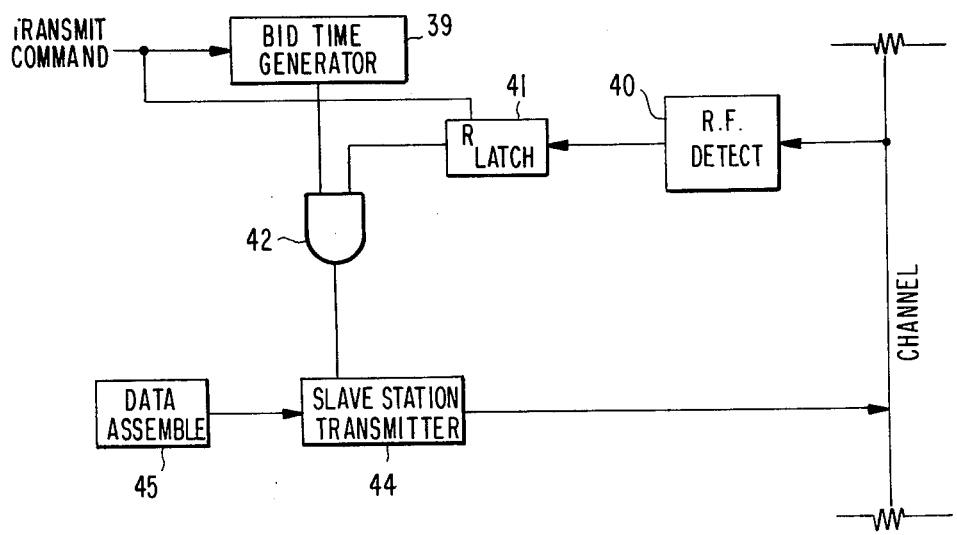
FIG. 4 is a schematic illustration of a controller for a slave station.

Referring now to FIG. 4, there is shown a controller which will permit a slave station of FIG. 1 access to the channel 2. A bid time delay is produced by time delay generator 39 in response to a transmit command and latch 41 is reset. The bid time delay elapses after ABTD seconds. RF energy is detected by detector 40 and latch 41 is set in response to the detected RF energy. Gate 42 will provide an enabling signal to transmitter 44 when an absence of RF energy occurrs during the bid time delay. The enabling signal will key transmitter 44 into operations transmitting data in data assemble 45. Thus, access to the channel is permitted by each slave station after sensing the absence of traffic on the communications channel 2.

The above description can of course apply to those systems which transmit and receive on full duplex frequencies and utilize cable, or other signal carrying mediums. Those skilled in the art will recognize other systems in accordance with invention as defined by the appended claims.

Having thus described my invention, what I claim as new, and desire to secure by Letters Patent is:

1. In a communications system wherein a plurality of transmit-receive master stations for transmitting messages to a slave station utilize a common channel, an apparatus for establishing a transmit hierarchy at each master station comprising:

means for generating a composite time delay comprising a basic time delay and one or more incremental time delays in response to a command at the time a message is to be transmitted by one of said stations;

means for monitoring said common channel during said composite time delay;

means for generating further time delays in response to an indication that traffic is present on said channel during a previous time delay, each of a succession of said further time delays being shorter in duration than each previous time delay by one of said incremental time delays, and means for enabling transmission of said message when traffic is absent during one of said time delays, whereby stations contending for said channel are arranged in a transmit hierachy prioritized according to the time a command is received by each station.

2. In the communications system of claim 1 for utilizing a common communication channel by a plurality of master-slave transmit and receive combinations, wherein a plurality of master stations for transmitting and receiving data from slave on said channel are provided, a controller for each of said slave stations comprising:

means for initiating a bid time delay when said transceiver has a command to transmit; and means for monitoring traffic on said channel, during said bid time delay;

said means providing an inhibiting signal to said slave station to prohibit transmission when traffic is detected; whereby said transmission only occurs after a bid time expires without interruption by a traffic detection; and means for sending a message identifying said slave and a corresponding master station in the absence of a detection of said traffic, which when received by said master station permits control of said communication channel by said master.

3. In a communications system wherein a plurality of base stations communicate with a plurality of terminals assigned to a particular base station over a common channel, a controller for each base station comprising:

means for initiating a series of control times when a base station is commanded to transmit, each succeeding control time being shorter in length than a previous control time;

means for monitoring traffic on said common channel during each of said successive control times; and means for enabling transmission of said base station when no traffic is detected during one of said control times, whereby base stations are arranged in a substantially prioritized hierarchy for transmission, such that stations which have waited longer have shorter control times increasing the likelihood said longer waiting station will secure access to said common channel.

4. A system for communicating among users of a common communication channel comprising:

a plurality of stations corresponding to the number of said users connected to said common channel for transmitting and receiving information to and from said communications channel; each of said stations including a transmit controller for initiating transmission comprising:

a detector for monitoring for a period of time said communications channel to determine whether or not said channel is carrying a signal in response to a users request for transmission;

delay means for generating a time delay in response to said request means for inhibiting transmission by a station in response to an indication from said detector that said channel is being used during said time delay;

means for generating subsequent time delays in response to said detector indicating said channel is carrying a signal, said time delays being incrementally shorter than a previous delay, whereby transmission is continuously inhibited until one complete time delay occurs during which no signals are detected on the channel, those users making an earlier request to transmit and experience a shorter delay period between subsequent retransmission attempts than a subsequent requester for said communications channel request.

5. In a communications system wherein a plurality of transmit-receive stations for transmitting fixed length messages utilize a common channel, apparatus for preventing collisions of a station's transmission and establishing a substantially prioritized hierachy among stations comprising:

a carrier detection latch connected to said common channel for determining when another of said stations is transmitting; said latch being enabled in response to a transmit command;

means for generating an initial time delay in response to said command;

means for generating successive time delays following said initial time delay in response to an indication that the signal is present on said channel during a previous delay, each successive time delay being shorter by a predetermined increment than a previous time delay, comprising:

a basic time delay generator producing a repetitive basic time delay, means for generating a plurality of smaller incremental time delays, a shift register having multiple outputs for disabling in sequence each of said smaller incremental time delays;

a summation network combining said incremental time delays with said basic time delay, means for clocking said shift register including an AND gate connected to receive an input from said latch and an input from said summation network, whereby after each time delay expires, said shift register disables additional incremental time delays when said latch indicates the presence of another station transmitting decreasing the time delay produced by said summation network, means for enabling transmission by said station at the conclusion of a time delay when a signal from said summation network is coincident with an indication from said latch that a signal is absent from said channel during said time delay.

* * * * *